(12) United States Patent
Granado

(10) Patent No.: US 11,999,040 B2
(45) Date of Patent: Jun. 4, 2024

(54) HACKSAW MULTITOOL

(71) Applicant: Chance Granado, Temple Hills, MD (US)

(72) Inventor: Chance Granado, Temple Hills, MD (US)

( * ) Notice: Subject to any disclaimer, the term of this patent is extended or adjusted under 35 U.S.C. 154(b) by 64 days.

(21) Appl. No.: 17/210,058

(22) Filed: Mar. 23, 2021

(65) Prior Publication Data

US 2021/0291341 A1 Sep. 23, 2021

Related U.S. Application Data

(60) Provisional application No. 62/993,318, filed on Mar. 23, 2020.

(51) Int. Cl.
*B25F 1/04* (2006.01)
*B23D 49/12* (2006.01)
*B27B 21/02* (2006.01)

(52) U.S. Cl.
CPC ............... *B25F 1/04* (2013.01); *B23D 49/12* (2013.01); *B27B 21/02* (2013.01)

(58) Field of Classification Search
CPC .... B25F 1/04; B25F 1/006; B25F 1/00; B25F 1/02; B23D 49/12; B23D 59/001; B23D 59/006; B23D 51/00; B23D 51/03; B27B 21/02; B25G 1/08
USPC .......... 81/177.85; 7/138, 142, 148–150, 159, 7/163
See application file for complete search history.

(56) References Cited

U.S. PATENT DOCUMENTS

| | | | | |
|---|---|---|---|---|
| 487,635 | A | * | 12/1892 | McGown ................. B25D 1/00 30/152 |
| 594,279 | A | * | 11/1897 | Posey ..................... B26B 11/00 30/313 |
| 784,674 | A | * | 3/1905 | Haag ....................... B27B 21/08 30/514 |
| 806,515 | A | * | 12/1905 | Baumgartner ......... B23D 49/12 30/144 |
| 2,309,816 | A | * | 2/1943 | Allen ..................... B23D 51/03 30/512 |
| 2,576,869 | A | * | 11/1951 | Woltemath ............. B27B 21/00 7/149 |
| 3,038,177 | A | | 6/1962 | Fritz |
| 3,908,726 | A | * | 9/1975 | Swenson ............... B23D 51/03 30/518 |

(Continued)

*Primary Examiner* — David S Posigian
*Assistant Examiner* — Jacob Adam Montgomery
(74) *Attorney, Agent, or Firm* — Boudwin Intellectual Property Law, LLC; Daniel Boudwin

(57) ABSTRACT

A hacksaw multitool is provided. The device includes an elongated body having a first end opposite a second end. A bit receptacle is disposed within the first end. A plurality of interchangeable bits is removably securable within the bit receptacle. A channel is disposed within an upper side of the elongated body, wherein an arm is pivotally affixed within the channel at a proximal end of the arm. A saw blade is pivotally affixed to a distal end of the arm, wherein the saw blade is slidably engaged with the channel. The saw blade is selectively movable between a deployed position and a stowed position via actuation of the arm. The saw blade is disposed perpendicular to a longitudinal axis of the elongated body when in the deployed position and the saw blade is disposed entirely within the channel when in the stowed position.

7 Claims, 3 Drawing Sheets

(56) References Cited

U.S. PATENT DOCUMENTS

| | | | | |
|---|---|---|---|---|
| 4,580,344 | A * | 4/1986 | Jinghage | B23D 51/03 |
| | | | | 30/512 |
| 4,637,141 | A * | 1/1987 | Allen | B23D 51/03 |
| | | | | 30/512 |
| 5,067,190 | A * | 11/1991 | Gagnon | B25F 1/02 |
| | | | | 7/149 |
| 5,873,170 | A | 2/1999 | Stanley | |
| 6,009,584 | A * | 1/2000 | Padden | A46B 7/023 |
| | | | | 15/201 |
| 6,158,131 | A * | 12/2000 | Costanzo | B23D 51/03 |
| | | | | 30/512 |
| 6,453,564 | B1 * | 9/2002 | Foley | A62B 3/005 |
| | | | | 30/367 |
| 6,460,698 | B1 * | 10/2002 | Wang | B25F 1/02 |
| | | | | 70/456 R |
| 6,560,805 | B2 * | 5/2003 | Dallas | B25F 1/04 |
| | | | | 7/158 |
| 7,174,643 | B2 | 2/2007 | Merwe | |
| 7,634,956 | B2 * | 12/2009 | Rivera | B25F 1/02 |
| | | | | 81/439 |
| 9,180,535 | B2 | 11/2015 | Vanderbeek | |
| 9,440,346 | B2 * | 9/2016 | Grysen, Jr. | B25F 1/04 |
| 2008/0127499 | A1 | 6/2008 | Zakarian | |
| 2015/0026899 | A1 * | 1/2015 | Lawrence | B25F 1/04 |
| | | | | 7/138 |
| 2020/0023504 | A1 * | 1/2020 | Weinberger | B25G 1/10 |

* cited by examiner

HACKSAW MULTITOOL

CROSS REFERENCE TO RELATED APPLICATIONS

This application claims the benefit of U.S. Provisional Application No. 62/993,318 filed on Mar. 23, 2020. The above identified patent application is herein incorporated by reference in its entirety to provide continuity of disclosure.

BACKGROUND OF THE INVENTION

The present invention relates to multitools. More particularly, the present invention pertains to a multitool having a deployable saw blade.

Many individuals use a variety of different tools over the course of a work project, such as during home improvement or on a construction site. However, working with several different tools can be a stressful and frustrating experience. Necessary tools may be misplaced or require frequent trips to a toolbox for retrieval as various tool needs arise. This often results in intermittent work or inefficiency which can slow the rate of project completion. Additionally, carrying several different tools for a variety of work tasks can be cumbersome, weighing down a tool belt or portable toolbox throughout the course of the day. Typical multitools may be limited in scope, reducing overall tool carrying capacity needed by a minimal amount. Often, multitools further trade strength or durability for flexibility. Therefore, a durable multitool that consolidates a variety of tools into a compact format for ease of transport and use is desired.

In light of the devices disclosed in the known art, it is submitted that the present invention substantially diverges in design elements from the known art and consequently it is clear that there is a need in the art for an improvement to existing multitools. In this regard, the instant invention substantially fulfills these needs.

SUMMARY OF THE INVENTION

In view of the foregoing disadvantages inherent in the known types of multitools now present in the known art, the present invention provides a hacksaw multitool wherein the same can be utilized for providing convenience for the user when utilizing a variety of tools on a construction site.

The present system comprises an elongated body having a first end opposite a second end. A bit receptacle is disposed within the first end. A plurality of interchangeable bits removably securable within the bit receptacle. A channel is disposed within an upper side of the elongated body, wherein an arm is pivotally affixed within the channel at a proximal end of the arm. A saw blade is pivotally affixed to a distal end of the arm, wherein the saw blade is slidably engaged with the channel. The saw blade is selectively movable between a deployed position and a stowed position via actuation of the arm such that the saw blade is disposed perpendicular to a longitudinal axis of the elongated body when in the deployed position and the saw blade is disposed entirely within the channel hen in the stowed position. In some embodiments, a slot is disposed within the arm, wherein the slot is configured to receive the saw blade therein such that the arm rests flush with the upper side of the elongated body.

In some embodiments, the plurality of interchangeable bits is selected from a group consisting of an adjustable wrench head, a socket adaptor, and a screwdriver adaptor. In another embodiment, a plurality of hexagonal apertures is disposed within the second end of the elongated body, wherein the plurality of hexagonal apertures is dimensioned to removably secure a plurality of screwdriver bits therein. In other embodiments, measurement indicia are disposed along the upper side of the elongated body, wherein the measurement indicia define a ruler. In yet another embodiment, a spirit level is disposed within the elongated body. In some embodiments, a brush head having a plurality of bristles thereon, the brush head affixed to a lower side of the elongated body. In another embodiment, the brush head is slidably disposed within a compartment within the elongated body, such that the brush head is selectively movable between an extended position and a retracted position, wherein the retracted position the brush head is disposed entirely within the compartment. In other embodiments, a switch is disposed on the elongated body, whereupon actuation of the switch the brush head moves between the extended position and the retracted position. In yet another embodiment, a loop is disposed on an exterior side of the arm, wherein the loop is configured to provide a gripping surface. In some embodiments, grip portions are disposed along the elongated body.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
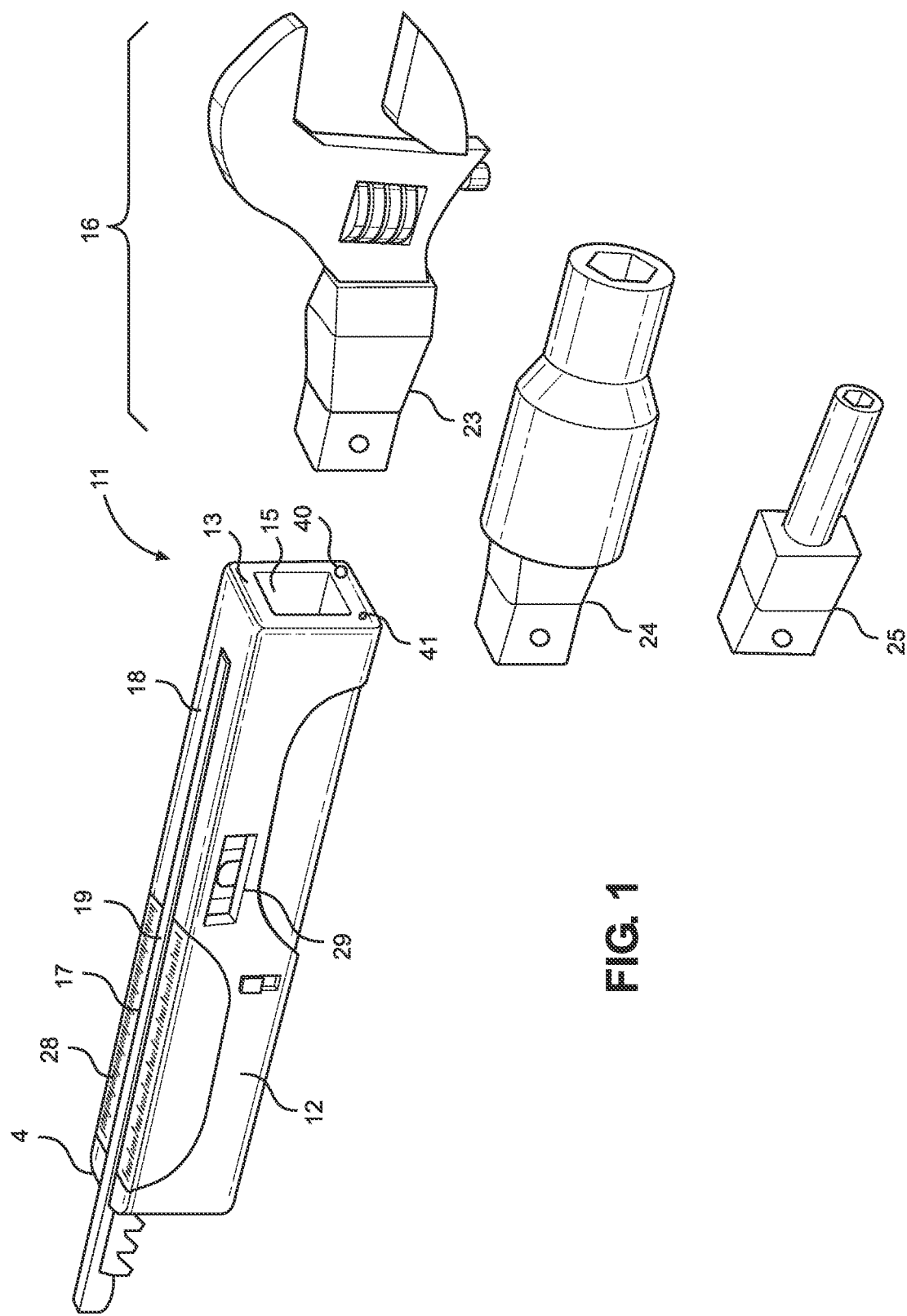
FIG. 1 shows an exploded view of an embodiment of the hacksaw multitool.

Reference is made herein to the attached drawings. Like reference numerals are used throughout the drawings to depict like or similar elements of the hacksaw multitool. The figures are intended for representative purposes only and should not be considered to be limiting in any respect.

Figure 3:
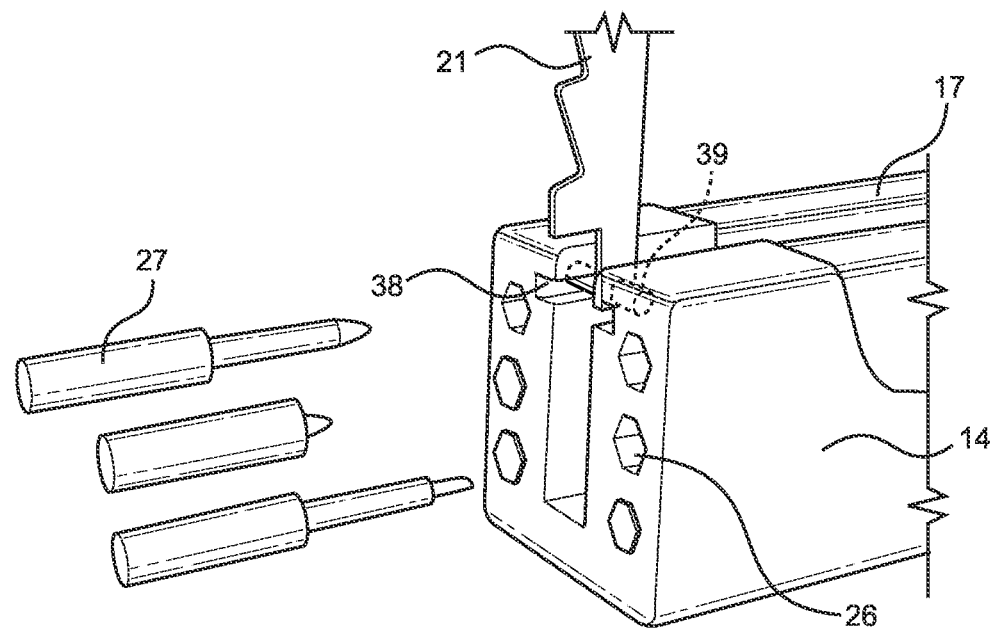
FIG. 3 shows a close-up view of the second end of an embodiment of the hacksaw multitool.

Referring now to FIG. 1, there is shown an exploded view of an embodiment of the hacksaw multitool. The hacksaw multitool 11 comprises an elongated body 12 having a first end 13 opposite a second end 14. A bit receptacle 15 is disposed in the first end 13 of the elongated body 12, wherein the bit receptacle 15 removably secures an interchangeable bit 16 therein. In the illustrated embodiment, the interchangeable bits include various tool heads, including an adjustable wrench head 23, a socket adaptor 24, and a screwdriver bit adaptor 25. Alternate tool heads may be adapted for securement within the bit receptacle 15 as desired. In the shown embodiment, the bit receptacle 15 further comprises recesses therein for removably securing protrusions on each of the interchangeable bits 16. In some embodiments, the protrusions and recesses are coupled via magnetic engagement to increase securement within the bit receptacle 15. The screwdriver bit adaptor 25 includes an opening configured to receive a hexagonal screwdriver bit (as shown in FIG. 3, 27) therein. In the illustrated embodiment, the elongated body 12 comprises a rectangular prism shape, such that torque can be more readily applied by the user to rotate the interchangeable bits 16. Alternate elongated body 12 form factors can be utilized to provide a comfortable ergonomic grip.

A channel 17 is disposed within an upper side 18 of the elongated body 12 along a longitudinal axis thereof, wherein the channel 17 is dimensioned to receive an arm 19 therein. As further described elsewhere herein, the arm 19 is selectively movable between a deployed position and a collapsed position, wherein the arm 19 is disposed within the channel 17 when in the collapsed position. In the shown embodiment, an exterior side of the arm 19 rest flush with the upper side 18 of the elongated body 12 when the arm 19 is in the collapsed position. Additionally, in the shown embodiment, a plurality of measurement indicia 28 are disposed along the upper side 18 of the elongated body, wherein the measurement indicia 28 define a ruler. In the shown embodiment, the measurement indicia 28 are disposed on opposing sides of the channel 17, such that the elongated body 12 can be utilized as a ruler in multiple orientations. In some embodiments, the measurement indicia 28 are disposed along an entire length of the upper side 18 to provide a ruler having greater measuring capability.

In the illustrated embodiment, a spirit level 29 is disposed within the elongated body 12, such that the user can utilize the hacksaw multitool 11 to gauge the angle of a surface. In the shown embodiment, the spirit level 29 is disposed on a singular aide of the elongated body, however, in other embodiments, a second spirit level 29 is disposed on an opposing side of the elongated body, such that the elongated body 12 is reversible. Additionally, in the illustrated embodiment, a laser pointer 41 is disposed on the first end 13, wherein the laser pointer 41 is configured to emit a linear beam of light in a desired direction. In the shown embodiment, a flashlight 40 is disposed on the first end 13 of the elongated body 12. In each case, a control associated with each of the flashlight 40 and the laser pointer 41 can be disposed on the elongated body 12, such that when actuated, each control activates one of the flashlight 40 and the laser pointer 41.

Figure 2:
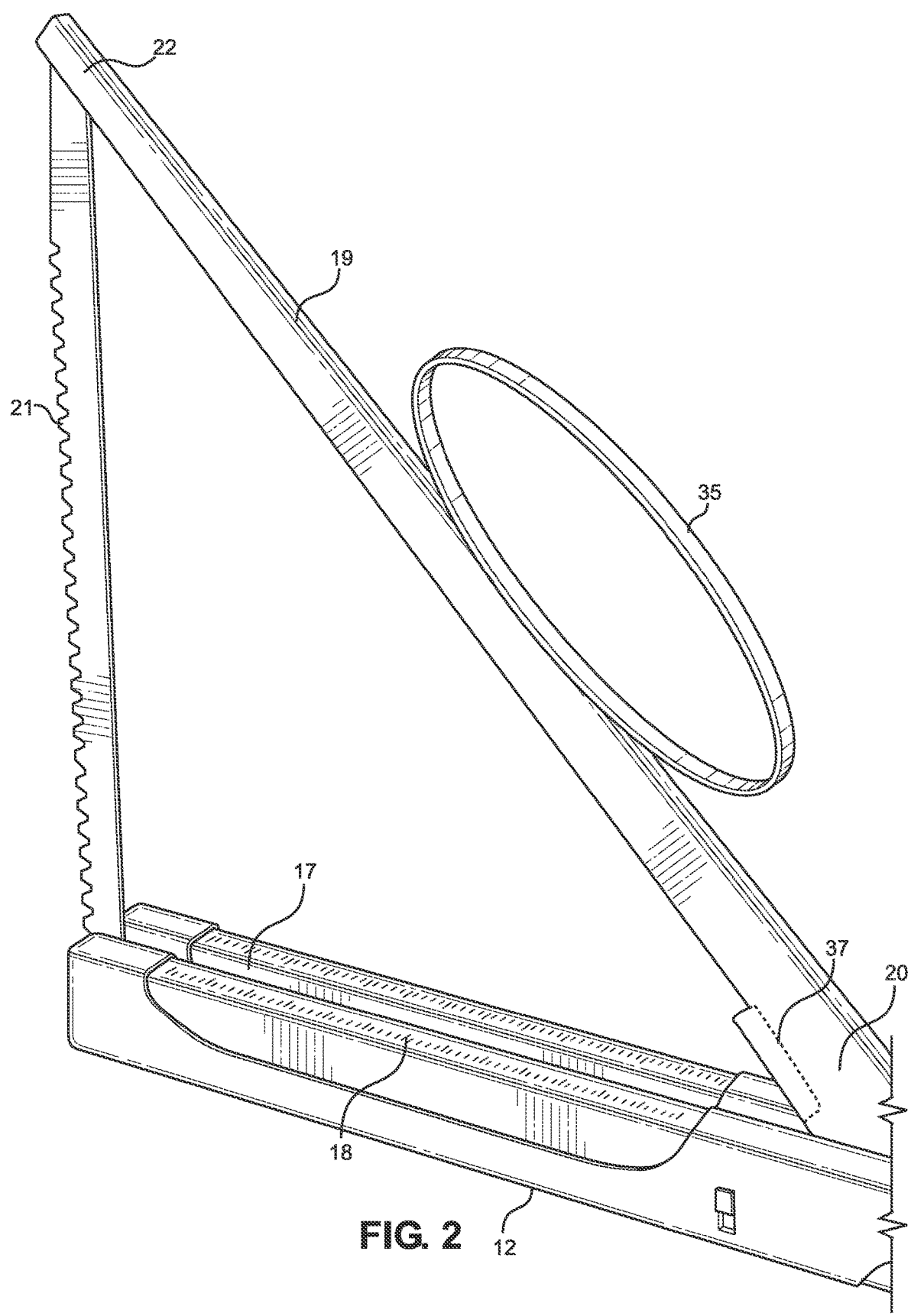
FIG. 2 shows a perspective view of the saw blade of an embodiment of the hacksaw multitool in the deployed position.

Referring now to FIG. 2, there is shown a perspective view of the saw blade of an embodiment of the hacksaw multitool in the deployed position. The arm 19 is pivotally affixed to the elongated body 12 within the channel 17 at a proximal end 20 of the arm 19, such that the arm is selectively movable between a collapsed position and an extended position. In the illustrated embodiment, a slot 37 is disposed within a lower edge of the arm 19, wherein the slot 37 is configured to receive a saw blade 21 therein. In this manner, the upper end of the arm 19 can rest flush against the upper side 18 of the elongated body 12. In the shown embodiment, a loop 35 is disposed on the upper end of the arm 19, wherein the loop 35 is configured to provide a gripping surface for use in selectively moving the arm 19 between the extended position and a collapsed position. In some embodiments, the loop 35 is removably securable to the arm 19, such that the loop 35 can be removed to reduce the space required for storage.

The saw blade 21 is pivotally affixed to a distal end 22 of the arm 19 and slidably disposed within the channel 17, such that when the arm 19 is moved to the extended position, the saw blade 21 is deployed perpendicular to a longitudinal axis of the elongated body 12. In the deployed position, the teeth of the saw blade 21 are oriented towards the second end of the elongated body 12. In this manner, the user can grasp the elongated body 12 and the arm 19 and utilize the saw blade 21 to cut a desired object. In the shown embodiment, the teeth of the saw blade 21 are absent along a portion of the saw blade 21 adjacent the distal end 22 of the arm 19, such that when the saw blade 21 in the collapsed position, no teeth are disposed outside of the channel 17. In this manner, the risk of accidental cuts caused by the saw blade 21 when not in use can be minimized. In some embodiments, the saw blade 21 and the arm 19 are configured to lock in the extended and deployed positions, respectively, such that the arm 19 does not collapse due to forces applied to the saw blade 21 during use. In such embodiments, a latch can be utilized to engage and disengage the lock of each of the arm 19 and the saw blade 21 in the extended position.

Referring now to FIG. 3, there is shown a close-up view of the second end of an embodiment of the hacksaw multitool. In the illustrated embodiment, the channel 17 further comprises a pair of grooves 38 therein on opposing walls of the channel 17, wherein the pair of grooves 38 are configured to slidably receive a pair of pins 39 extending from opposing sides of an end of the saw blade 21. In this manner, the pins 39 are slidably engage within the groves 38 to guide the saw blade 21 between a deployed position and a stowed position. Furthermore, the pins 39 serve to stabilize the saw blade 21 during use, such that the saw blade 21 remains centered within the channel 17 during use.

In the illustrated embodiment, a plurality of hexagonal apertures 26 is disposed in the second end 14 of the elongated body, wherein the plurality of hexagonal apertures 26 are configured to receive a plurality of screwdriver bits 27 therein. The plurality of screwdriver bits 27 include a hexagonal base dimensioned to frictionally engage within the plurality of hexagonal apertures 26. In some embodiments, the plurality of screwdriver bits 27 can be operably connected within the screwdriver bit adaptor shown in FIG. 1, however, in alternate uses, the plurality of screwdriver bits 27 can be reversed and resecured within the plurality of hexagonal apertures 26, such that a working end of the screwdriver bit 27 is exposed for use. In this manner, the second end 14 can be utilized as a screwdriver while a separate interchangeable bit is secured in the bit receptacle of the first end. In this way, the hacksaw multitool can simultaneously operate as a variety of tools.

Figure 4:
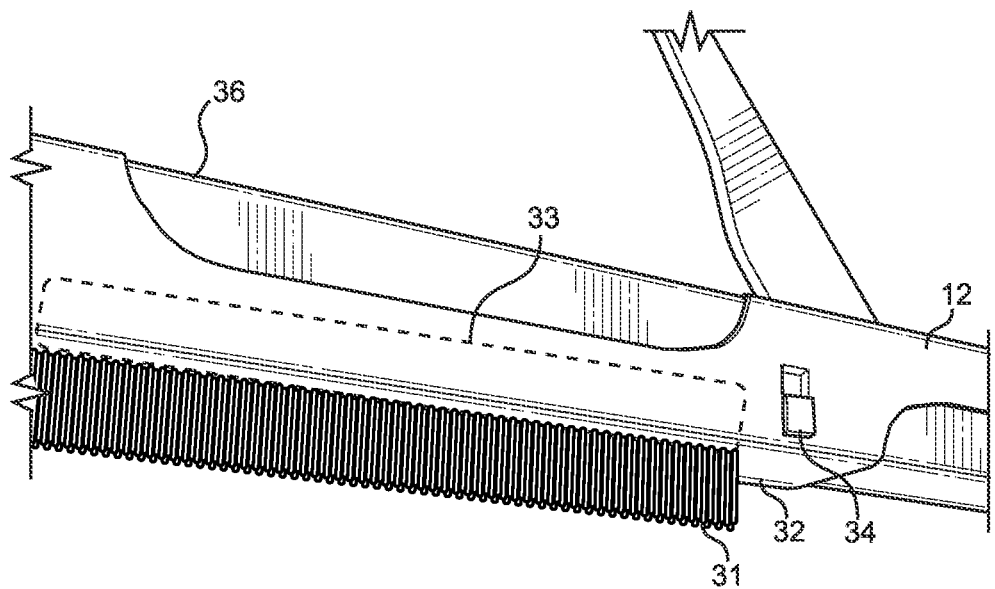
FIG. 4 shows a side view of the brush head of an embodiment of the hacksaw multitool.

Referring now to FIG. 4, there is shown a side view of the brush head of an embodiment of the hacksaw multitool. In the illustrated embodiment, a brush head having a plurality of bristles 31 is slidably disposed within a compartment 33 defined through a lower side 32 of the elongated body 12. The brush head is selectively movable between an extended position and a retracted position, wherein the plurality of bristles 31 are entirely disposed within the compartment 33 when in the retracted position. In this manner, the user can extend the plurality of bristles 31 to brush a surface, while retracting the plurality of bristles 31 to operate other aspects of the multitool. In the shown embodiment, a switch 34 is disposed on the elongated body 12 along a lateral side thereof, wherein the switch 34 is operably connected to the brush head. When the switch 34 is actuated, the brush head is configured to selectively move between the extended position and the retracted position. In the shown embodiment, the switch 34 comprises a sliding switch, however, in alternate embodiments other switch mechanisms are contemplated.

In the shown embodiment, at least one grip portion 36 is defined along the elongated body 12. The grip portions 36 are contemplated to comprise a high friction material configured to increase frictional engagement with a user's hand.

In the shown embodiment, a pair of grip portions 36 are defined along opposing sides of the elongated body 12 to facilitate a two-handed grip on the multitool. In some embodiments, the grip portions 36 may further comprise a textured surface to increase surface area in contact with the user's hand for the purposes of frictional engagement.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hacksaw multitool, comprising:
    an elongated body having a first end opposite a second end;
    a bit receptacle disposed within the first end;
    a plurality of interchangeable bits removably securable within the bit receptacle;
    a channel disposed within an upper side of the elongated body;
    wherein an arm is pivotally affixed within the channel at a first end of the arm; and
    a hacksaw blade pivotally affixed to a second end of the arm;
    wherein the hacksaw blade is slidably engaged with the channel;
    wherein the hacksaw blade is selectively movable between a deployed position and a stowed position via actuation of the arm;
    wherein the hacksaw blade is disposed perpendicular to a longitudinal axis of the elongated body when in the deployed position and the hacksaw blade is disposed within the channel when in the stowed position;
    further comprising a brush head having a plurality of bristles thereon, the brush head is affixed to a lower side of the elongated body;
    wherein the brush head is slidably disposed within a compartment within the elongated body, such that the brush head slides in a direction perpendicular to the longitudinal axis of the elongated body and is selectively movable between an extended position and a retracted position;
    wherein the retracted position of the brush head is disposed entirely within the compartment,
    further comprising a plurality of hexagonal apertures disposed within the second end of the elongated body;
    wherein the hexagonal apertures are dimensioned to removably secure a plurality of screwdriver bits therein; and
    further comprising a loop on an exterior side of the arm, the loop provides a gripping surface.

2. The hacksaw multitool of claim 1, wherein the interchangeable bits are selected from a group consisting of an adjustable wrench head, a socket adaptor, and a screwdriver adaptor.

3. The hacksaw multitool of claim 1, wherein a plurality of measurement indicia are disposed along the upper side of the elongated body and the measurement indicia defines a ruler.

4. The hacksaw multitool of claim 1, further comprising a spirit level is disposed within the elongated body.

5. The hacksaw multitool of claim 1, further comprising a switch disposed on the elongated body, whereupon actuation of the switch, the brush head moves between the extended position and the retracted position.

6. The hacksaw multitool of claim 1, further comprising a plurality of grip portions disposed along the elongated body.

7. A hacksaw multi tool, consisting of:
    an elongated body having a first end opposite a second end;
    a bit receptacle disposed within the first end;
    a plurality of interchangeable bits removably securable within the bit receptacle;
    a channel disposed within an upper side of the elongated body;
    wherein an arm is pivotally affixed within the channel at a first end of the arm; and
    a hacksaw blade pivotally affixed to a distal end of the arm;
    wherein the hacksaw blade is slidably engaged with the channel;
    wherein the hacksaw blade is selectively movable between a deployed position and a stowed position via actuation of the arm;
    wherein the hacksaw blade is disposed perpendicular to a longitudinal axis of the elongated body when in the deployed position;
    wherein the arm includes a slot therein, the slot is configured to receive the hacksaw blade therein, such that the arm rests flush with the upper side of the elongated body;
    wherein a plurality of measurement indicia are disposed along the upper side of the elongated body, the measurement indicia defining a ruler;
    wherein a plurality of hexagonal apertures are disposed within the second end of the elongated body;
    wherein the plurality of hexagonal apertures are dimensioned to removably secure a plurality of screwdriver bits therein; and
    wherein a loop on an exterior side of the arm, the loop provides a gripping surface.

* * * * *